United States Patent [19]
Kelch et al.

[11] 3,749,514
[45] July 31, 1973

[54] BLADE ATTACHMENT

[75] Inventors: George W. Kelch, Palm Beach; Bruce J. Taylor, Fort Pierce; Henry A. Welcer, Palm Beach, all of Fla.

[73] Assignee: United Aircraft Corporation, East Hartford, Conn.

[22] Filed: Sept. 30, 1971

[21] Appl. No.: 185,004

[52] U.S. Cl. .................. 416/95, 416/96, 416/217
[51] Int. Cl. ................................................ F01d 5/08
[58] Field of Search .................. 416/92, 96, 97, 95, 416/213, 217, 222, 215–216

[56] References Cited
UNITED STATES PATENTS

| 2,431,249 | 11/1947 | Heppner | 416/216 X |
| 2,675,208 | 4/1954 | Weinberg | 416/92 X |
| 2,696,364 | 12/1954 | Bartlett | 416/214 X |
| 2,857,132 | 10/1958 | McDowall | 416/222 UX |
| 3,297,301 | 1/1967 | Petrie et al. | 416/213 |
| 3,550,372 | 12/1970 | Craig | 416/96 UX |
| 3,609,841 | 10/1971 | Telfer et al. | 416/213 X |

FOREIGN PATENTS OR APPLICATIONS

| 675,222 | 5/1939 | Germany | 416/213 |
| 939,782 | 3/1956 | Germany | 416/213 |
| 868,788 | 5/1961 | Great Britain | 416/97 |

Primary Examiner—Everette A. Powell, Jr.
Attorney—Jack N. McCarthy

[57] ABSTRACT

A blade attachment means for use in a small gas turbine engine. A disk is provided having at least two annular flanges extending radially therefrom with a plurality of blades having root fingers metallurgically bonded to the flanges. The flanges being approximately the same length as the blades with the space between the fingers providing for the passage of a coolant to cooling passages in the blade. Said fingers having a brazing area sized so that at least a 50 percent braze coverage will provide the necessary bond strength.

2 Claims, 4 Drawing Figures

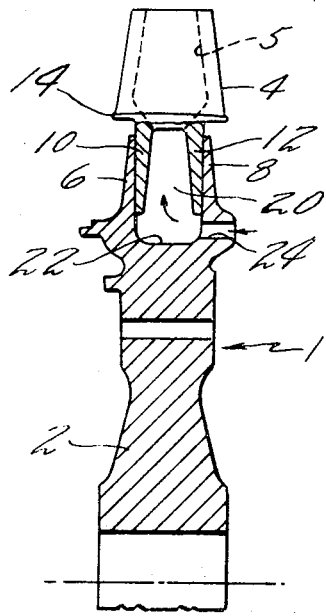
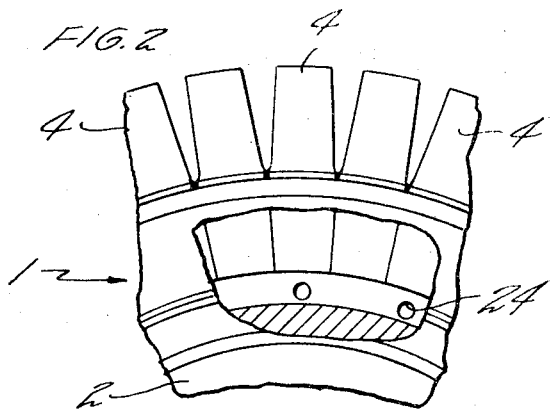
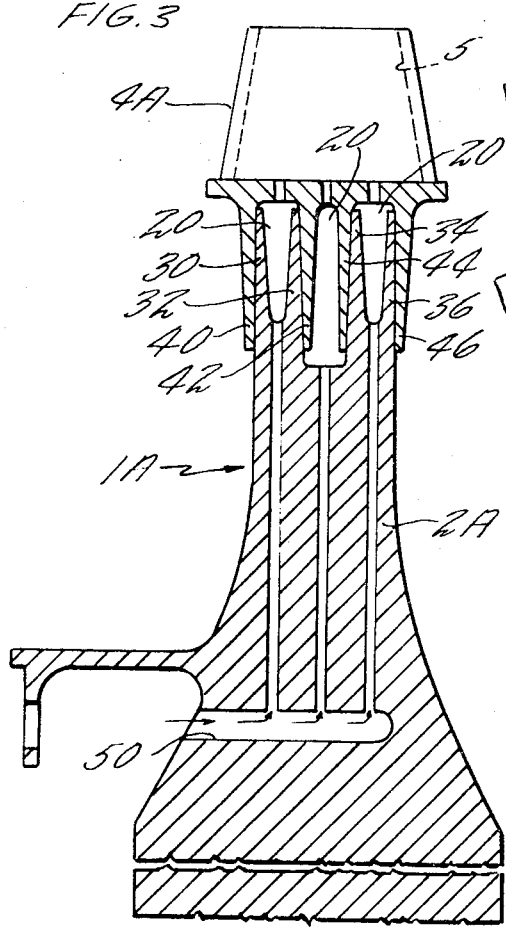
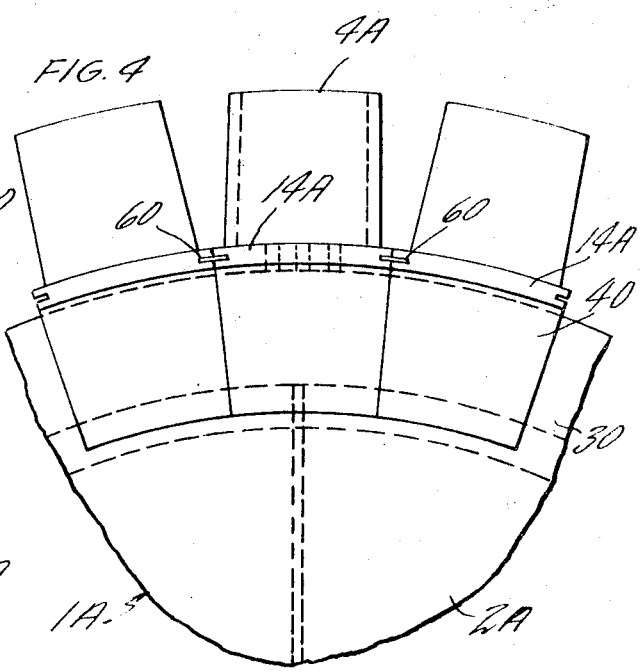

ively mate with the flanges 6 and 8 in such a manner that the mating adjacent finger surfaces of the fingers can be brazed# 3,749,514

BLADE ATTACHMENT

This invention herein described was made in the course of or under a contract with the Department of the Army.

BACKGROUND OF THE INVENTION

Optimized attachment methods that reduce rotor weight and improve cooling air sealing are vital parts of advanced technology necessary for the successful development of small, high temperature engines. A turbine blade and disk attachment program was conducted to evaluate attachment methods suitable for small gas turbine engines. Other types of attachments for use with small blades were looked into including: (1) the standard fir-tree, (2) the blades cast integral with the disk, (3) an inverted fir-tree and (4) a pinned connection.

SUMMARY OF THE INVENTION

The general objective of the present invention is to provide a novel turbine rotor having blades affixed to the disk by metallurgical bonding such as brazing, a high temperature diffusion, or equivalent metallurgical method. The function of this blade and disk attachment is to provide an improvement in attachment strength-to-weight ratio relative to state-of-the-art mechanical attachments and to thus permit small turbines to achieve higher rotating speeds.

In accordance with the present invention, a novel turbine rotor is provided for a small gas turbine having a gas flow under 10 lbs. per second. In an engine of this type the blade length is generally one inch or under. The fabricated assembly consists of a rotor disk with a plurality of hollow blades attached thereon, and in which a fluid coolant such as air may be circulated through interconnected passages in the disk, attachment, and blades with the elimination of fluid leakage paths. Specific leak paths eliminated are the cooling fluid leakage and the primary working fluid interstage leakage in the attachment region.

This invention provides an attachment having a plurality of supporting fingers on the blades and flanges on the disk which deflect axially to relieve thermal stresses. This feature is particularly important for the condition where the turbine blade, subjected to high gas temperature, operates at a temperature greater than the disk. This arrangement also provides a box cross-section which gives the attachment a resistance to fatigue.

This invention also provides an attachment wherein the supporting fingers of the blade are approximately the length of the blade and are sized so that the bond cover area of the fingers need only be 50 percent or greater to provide the proper bond strength.

BRIEF DESCRIPTION OF THE DRAWINGS

FIG. 1 is a radial sectional view of a turbine rotor showing the invention in a two finger configuration.

FIG. 2 is a fragmentary view of the left-hand side of the rotor shown in FIG. 1 with a portion broken away showing the interior of the blade root connection.

FIG. 3 is a radial sectional view of a gas turbine rotor showing a modification of the invention having a four finger configuration.

FIG. 4 is a fragmentary view of the left-hand side of the rotor shown in FIG. 3.

DESCRIPTION OF THE PREFERRED EMBODIMENT

Referring to FIGS. 1 and 2, a rotor assembly 1 is shown having a disk 2 with blades 4 attached thereto. The rotor disk 2 contains two spaced annular flanges 6 and 8 at the outer periphery of the disk that form continuous circumferential extensions, in spaced planes of the disk. Each rotor blade has its root formed having spaced tapered fingers 10 and 12 which extend radially inwardly from the blade platform 14 and mate with the flanges 6 and 8 in such a manner that the mating adjacent finger surfaces of the fingers can be brazed thereto. Blade 4 has a cooling passageway 5 therein which permits a flow of coolant therethrough, said passageway 5 opens into the area formed by the spaced fingers 10 and 12. While the passageway 5 is shown exiting out the tip of the blade, holes could extend through the surface of the blades as desired to permit employment of other cooling techniques. The root fingers 10 and 12 of each blade fit within the annular disk flanges 6 and 8 of the rotor disk 2. This construction forms a box providing excellent resistance to fatigue.

A prebrazing mating surface clearance of 0.001 to 0.003 inches is provided and is filled with brazing material by capillary action during a brazing cycle. When the fingers are to be plated before brazing, a slight extra surface clearance is provided, such as up to 0.005 inches. A nickel plate can be placed on a mating surface for prebrazing surface preparation to prevent oxide formation.

The complete disk and blade rotor assembly, with braze paste or wire appropriately applied, is brazed in one furnace cycle. A subsequent diffusion heat treatment cycle, diffuses the braze melting point depressors from the joint and diffuses the braze material into the two adjacent parent materials eliminating the joint interface and producing a homogenous microstructure. The brazed coverage should represent 50 percent or more of the side area of the fingers which are being brazed. While a brazed bond has been referred to, it is to be understood that other metallurgical bonds can be used. The methods shown in U. S. Pat. No. 3,530,568 and U. S. application Ser. No. 130,149 are examples thereof.

The spacing of the fingers 10 and 12 of the blades form a continuous circumferential passage 20 with the outer surface 22 of the rotor disk which is the bottom surface between the two spaced annular disk flanges 6 and 8. The flange spacing minimizes blade bending. A plurality of openings 24 extend through the annular disk fingers 8 for the purpose to be hereinafter set forth.

This circumferential passage 20 performs two important functions. First, it provides a sealed passage network to distribute cooling air to cooling passages in the blade, sealing between adjacent blade platforms is provided by a brazed in place seal (not shown). A coolant is supplied to the openings 24 to provide a supply of cooling air to the passage 20 and then to the blade passages 5. Second, the passage acts as an insulator that restricts heat condution from the blades 4 to the disk 2 thereby reducing disk cooling requirements. This insulating effect is consistent with a design practice of operating the turbine blades at a higher temperature than the turbine disk.

The taper of the annular disk flanges 6 and 8 and the blade fingers 10 and 12 provide flexure to relieve the thermal stresses produced by the temperature differences between the disk and blade platform. This attachment permits the flanges and fingers to deflect axially. The blade fingers 10 and 12 taper radially inwardly while the flanges 6 and 8 taper radially outwardly.

In a test program parameters were set up as follows: a turbine tip speed of 1,900 feet per second, a turbine inlet temperature of 2,500° F and a flow rate of 2 lbs. per second. Since the construction is for small high performance gas turbines, the blade tip radius was considered to be 2.67 inches and the blade root radius was considered to be 2.25 inches making the blade approximately 0.42 inches in length. The blade cord was considered to be 0.5 inches. This construction is especially useful in the attachment of small blades where the flow rate is 10 lbs. per second or less. In a construction of this type the blades are generally in the length range of one inch or under. The advantages of this construction over comparable conventional attachment means for a 2 lb./sec. engine are contained in Table I.

TABLE I

WEIGHT AND STRENGTH COMPARISON

|  | Fir-Tree Attachment | Brazed Attachment |
|---|---|---|
| Attachment to airfoil centrifugal weight ratio | 6.4 | 3.3 |
| Attachment strength to attachment centrifugal weight ratio | 0.91 | 1.18 |

Referring to FIGS. 3 and 4, a rotor assembly 1A is shown having a disk 2A with four spaced annular flanges 30, 32, 34 and 36. Each blade 4A has its root formed having four spaced tapered fingers 40, 42, 44 and 46. These flanges and fingers are made in a similar manner as those of FIG. 1 and are fixed thereto by the same means. In their assembly, the fingers 40 and 42 fit around the flanges 30 and 32 and the fingers 44 and 46 fit around the flanges 34 and 36. This construction forms three circumferential passages 20. Passage means 50 distribute cooling air to the three cooling passages 20. These passages 20 have openings into the passageway 5 in the blade in the same manner as the construction shown in FIG. 1. This construction is used where a severe centrifugal blade pull is to be encountered to insure a sufficient bond area.

Sealing between adjacent blade platforms is provided by a brazed in place seal plate 60. Matching grooves in adjacent blade platforms 14A provide for insertion of the seal plate.

While the invention describes individual blades affixed to said disk, a plurality of blade segments made up of at least two blades may be employed for ease of fabrication and to further reduce both coolant and interstage leakage.

We claim:

1. A high speed rotor comprising a small rotor disk and a plurality of small blades, said disk having an outer surface with a pair of spaced annular radial flanges extending therefrom, said annular radial flanges being a continuous circumferential extension from each side of the disk, each blade having a blade platform, each blade having a bottom surface below said platform with a pair of spaced root fingers extending therefrom, said root fingers having a flat surface overlapping and being bonded to a flat surface on said radial flanges, said platform extending forwardly and rearwardly over the annular radial flanges, said flanges and said root fingers being of such length that the bottom surface of the blade is spaced from the outer surface of the rotor disk a distance not less than about half the length of the blade, a circumferential passage being formed between the bottom surface of the blade and the outer surface of the rotor disk and the flanges and root fingers, said passage being sized to act as an insulator to restrict heat conduction from the blades to the disk, means for supplying a coolant through said passage, the length of said blades being approximately one inch or less, the root fingers being thin and tapered inwardly from said bottom surface and said radial flanges being thin and tapered inwardly as they extend from said outer surface, said thin flanges and fingers providing for axial deflection in response to growth due to the blades operating at a much higher temperature than the main body of the disk and reducing the heat flow into the disk.

2. A high speed rotor as set forth in claim 1 wherein said root fingers have an area so that at least a 50 percent bond coverage of said area with the radial flanges will provide the necessary bond strength.

* * * * *